United States Patent [19]

Jenkner

[11] Patent Number: 4,964,781

[45] Date of Patent: Oct. 23, 1990

[54] APPARATUS FOR SORTING, STACKING AND CONVEYING PLATE WORKPIECES

[76] Inventor: Erwin Jenkner, Lindenstr. 13, D-7261 Gechingen-Bergwald, Fed. Rep. of Germany

[21] Appl. No.: 112,533

[22] Filed: Oct. 22, 1987

[30] Foreign Application Priority Data

Oct. 23, 1986 [DE] Fed. Rep. of Germany ....... 3636107
Oct. 24, 1986 [DE] Fed. Rep. of Germany ....... 3636323

[51] Int. Cl.$^5$ .............................................. B65G 35/00
[52] U.S. Cl. .................................. 414/790.7; 198/369; 414/790.9; 414/903; 414/930
[58] Field of Search ................. 198/366, 369, 372; 414/903, 927, 930, 790.7, 790.9, 791.1

[56] References Cited

U.S. PATENT DOCUMENTS

| 4,002,249 | 1/1977 | Shinomiya et al. | 414/927 X |
| 4,311,425 | 1/1982 | Pulda | 414/930 X |
| 4,401,204 | 8/1983 | Roseman et al. | 198/366 X |
| 4,457,657 | 7/1984 | Karis et al. | 414/903 X |
| 4,576,536 | 3/1986 | Benuzzi | 198/372 X |
| 4,765,791 | 8/1988 | Brandt et al. | 198/369 X |

FOREIGN PATENT DOCUMENTS

| 2145011 | 5/1972 | Fed. Rep. of Germany . | |
| 2459571 | 7/1975 | Fed. Rep. of Germany . | |
| 670506 | 7/1979 | U.S.S.R. | 414/790.9 |

Primary Examiner—Robert J. Spar
Assistant Examiner—Janice Krizek
Attorney, Agent, or Firm—Herbert Dubno; Andrew Wilford

[57] ABSTRACT

An arrangement for conveying and stacking final products created by subdivision of a succession of plate blanks into a plurality of such products comprises an input conveyor for supplying the products in a longitudinal transport direction at a predetermined upper level to a stacking station and an output conveyor offset laterally from the input conveyor for transporting stacks of the products away from the stacking station in the direction and having an upstream end laterally adjacent the stacking station at a lower level below the upper level of the input conveyor. A sorter at the station receives the products from the input conveyor at the upper level and moves them at the upper level to either of two stacking substations longitudinally aligned with the upstream end of the output conveyor. Respective stacking units at the substations each in turn have a stacking table displaceable vertically between the upper and lower levels and horizontally displaceable transversely of the transport direction between a basic position at the respective substation for receiving the final products therefrom and an extended position aligned longitudinally with the output conveyor for delivering the final products thereto and a conveyor section fixed to and displaceable jointly transversely with the stacking table such that in the basic position of the respective stacking table it forms a longitudinal continuation of the output conveyor.

10 Claims, 5 Drawing Sheets

APPARATUS FOR SORTING, STACKING AND CONVEYING PLATE WORKPIECES

FIELD OF THE INVENTION

The present invention relates to arrangements for treating and handling plate-shaped objects in general and, more particularly, to a plate subdividing and a product conveying and stacking machine.

BACKGROUND OF THE INVENTION

There are already known various installations capable of sawing or otherwise subdividing and distributing or sorting plate-shaped objects, among them such including a subdividing arrangement that includes a plurality of sawing devices that perform longitudinal and transverse cuts and are thus capable of sawing a plate blank, which consists of a single plate or of a plate packet, into equal-width or different-width longitudinal and transverse strips in order to obtain in this manner from the plate blank a multitude of final products that may have different sizes. In such installations, it is also already known to transfer the respective final products to a plurality of stacking stations at which such products are stacked, and the thus obtained stacks are eventually transported by means of at least one roller conveyor that leads away from the installation to their destination or destinations.

One construction of the plate subdividing and resultant product conveying and stacking machine of this type is known, for instance, from the German published patent application DE-OS 27 02 725. In this machine, the final products which are obtained in a subdividing arrangement by subdividing or sawing plate-shaped blanks are sorted according to size to a plurality of roller conveyors that are arranged parallel next to each other. A stacking unit is associated with each of these roller conveyors and is operative for stacking the final products that are supplied thereto by the respective roller conveyor. Each of the final product stacks which is formed in the stacking unit of this type can be transported away from the stacking unit by means of a further roller conveyor, and is then supplied to a loading station.

Inasmuch as each of the roller conveyors which leads to the respective associated stacking unit is able to receive only final products having the same size, and of transporting such same-size final products to the associated stacking station, it is necessary to provide a large number of such roller conveyors with the associated stacking units, in order to enable the sawing or subdivision of the plate-shaped blank or preform by the sawing arrangement into a corresponding number of different final products.

Each of the final products may consist of a multitude of superimposed plate-shaped objects the number of which corresponds to the number of individual plates in the plate-shaped blank. The plate-shaped blank may be constituted by a single plate, or by a plate package.

It is also known in stacking installations which are arranged downstream of a sawing arrangement and which are operative for stacking the final products or objects that are obtained from the plate-shaped blank by sawing, to arrange two stacking units for the final products immediately next to one another. Then, a discharge roller conveyor is associated with the last one of these stacking units and serves for the transportation of the stacks of final products which are formed in both of these stacking units away from such units. To this end, the lifting tables of these two stacking units are arranged immediately next to one another in such manner that the stack that is formed on the lifting table of the front stacking unit can be transported, when the lifting table of the front stacking unit is in its lowermost position and the lifting table of the rear stacking unit is also in its lowermost position and is empty, via the lifting table of such rear stacking unit to the discharging or transporting-away roller conveyor that is situated at the elevation that corresponds to that of the lifting tables of the two stacking units when such lifting tables are in their lowermost positions.

However, this has the disadvantage that considerable time losses may be incurred in the transportation of the final product stack that has been formed on the front stacking unit away from such stacking unit, inasmuch as this type of transportation or discharge always makes it necessary to assure that the rear stacking unit is temporarily empty during such discharge, and that no stack is being formed thereon during this time. Consequently, the advantage of the arrangement of the two stacking units immediately next to one another for the transportation of the final products of different sizes to such adjacent stacking units, which results from the fact that such different-size final products are forwarded along the same path, is lost or largely lost in this manner.

SUMMARY OF THE INVENTION

Accordingly, it is a general object of the present invention to avoid the disadvantages of the prior art.

More particularly, it is an object of the present invention to provide a subdividing and sorting machine which does not possess the drawbacks of the known machines of this type.

Still another object of the present invention is to devise a machine of the type here under consideration which is particularly advantageous as far as the throughput of the machine is concerned.

OBJECTS OF THE INVENTION

It is yet another object of the present invention to design the above machine in such a manner as to be able to obtain considerably shorter cycle times than heretofore possible.

A concomitant object of the present invention is to provide the machine of the above type as to be relatively simple in construction, inexpensive to manufacture, easy to use, and yet reliable in operation.

An arrangement according to this invention for conveying and stacking final products created by subdivision of a succession of plate blanks into a plurality of such products comprises an input conveyor for supplying the products in a longitudinal transport direction at a predetermined upper level to a stacking station and an output conveyor offset laterally from the input conveyor for transporting stacks of the products away from the stacking station in the direction and having an upstream end laterally adjacent the stacking station at a lower level below the upper level of the input conveyor. A sorter at the station receives the products from the input conveyor at the upper level and moves them at the upper level to either of two stacking substations longitudinally aligned with the upstream end of the output conveyor. Respective stacking units at the substations each in turn have a stacking table displaceable vertically between the upper and lower levels and horizontally displaceable transversely of the transport direction between a basic position at the respective substation for receiving the final products therefrom and an extended position aligned longitudinally with the output conveyor for delivering the final products thereto and a conveyor section fixed to and displaceable jointly transversely with the stacking table such that in the basic position of the respective stacking table it forms a longitudinal continuation of the output conveyor.

In the arrangement or installation of this type, the single stacking unit row may include two stacking units or preferably even more than two such stacking units, which renders it possible to further expedite and facilitate the supply of the final products to the stacking units. It can be provided, without difficulty, that the final products of different sizes are supplied by a common supply roller conveyor to one or two of the stacking unit rows, which is very economical.

The lifting tables of the stacking units of a stacking unit row may be arranged immediately next to one another, which is, in general, particularly advantageous. However, the present invention also makes it no longer mandatory to arrange these lifting tables immediately next to one another; rather, the lifting tables can also be arranged at a spacing from one another, when this is necessary or desirable for any reason.

Each stack which is formed in each of the stacking units consists, in each instance, of final products of the same size. However, it is also possible to simultaneously stack final products of different sizes in the respective different stacking units. It is also possible to simultaneously stack two or more stacks of the final products of the same size or of different sizes in one or more of the stacking units, when the conditions and the dimensions of the respective lifting table permit or warrant such simultaneous stacking.

Inasmuch as at least one of the stacking units of the respective row is transversely movable, and its lifting table can be moved toward the respective downstream roller conveyor, in order to make it possible for the stacks that are formed on this lifting table to be directly transported away by this downstream roller conveyor, the installation constructed in accordance with the present invention renders it possible to achieve a rapid throughput of the final product and a rapid transportation away of the stacks, and a very economical operation of this installation, inasmuch as the transportation of the stacks away from all of the stacking units is not impeded by the other stacking unit or units of the same row. This transportation takes place in particular downstream of the respective other stacking unit or units, which at this time is or are in its or their basic position, and past which the transportation path of the respective stacks on the downstream roller conveyor is conducted.

It is particularly advantageous when the downstream conveyor includes a region that is arranged laterally adjacent of the last one of the stacking units in the stacking unit row, and when at least that of the stacking units of the stacking unit row that is arranged immediately before the last stacking unit is movable transversely to the longitudinal direction of the downstream roller conveyor between its basic and extended positions to bring the lifting table thereof toward the downstream roller conveyor for further conveyance of the respective stack supported thereon. In this context, it is advantageous when the downstream roller conveyor includes at least one separate roller conveyor portion which is movable into and out of a position at a predetermined region of the downstream roller conveyor situated laterally adjacent of at least one of the stacking units that is movable between the basic and extended positions thereof, and when the lifting table of the one movable stacking unit is situated when in the extended position at the predetermined region of the downstream roller conveyor instead of the separate roller conveyor portion after the latter has been moved out of the predetermined region. Under some circumstances, it is advantageous when even the last one of the stacking units of at least one stacking unit row is movable transversely to the longitudinal direction of the downstream roller conveyor between its basic and extended positions, when the downstream roller conveyor includes a separate roller conveyor portion which is movable into and out of a position at a predetermined region of the downstream roller conveyor situated laterally adjacent the last stacking unit, and when the lifting table of the last stacking unit is situated when in the extended position at the predetermined region of the downstream roller conveyor instead of the separate roller conveyor portion after the latter has been moved out of the predetermined region.

The region or a separate longitudinal portion of the downstream roller conveyor which is situated downstream of the respective stacking unit can be arranged at a spacing from the respective stacking unit and its downstream side, or it may be situated at the respective stacking unit with or without spacing from the downstream side of the respective stacking unit, or it may be arranged in any other desired manner.

The present invention also renders possible simultaneous advance of the final products that are being supplied to the stacking units and of the stacks which are being conveyed away from such units, which is desired and extremely advantageous in installations of this type.

The present invention further renders it possible to arrange a practically unlimited arbitrary number of the stacking units in the particular row. As a result, the number of the final products of different sizes that can be simultaneously stacked can be made practically arbitrarily large, so that this installation also renders it possible to utilize plate subdivision patterns which could have been handled, if at all, by the conventionally constructed installations of the type here under consideration, only at a considerably higher expenditure.

Also, the amount of space occupied by the installation is relatively small, so that there is also possible a better utilization of the available space. In addition, the stacking and conveying arrangement or installation constructed in accordance with the present invention renders it possible for the subdividing device to operate and to saw or subdivide the plate blanks into the final products with relatively short cycle times, inasmuch as these final products can be rapidly transported by and through the arrangement of the present invention and stacked.

The transfer of the final products, which are obtained in the sawing device or machine from the respective plate blanks, to the respective stacks or stacking units can be achieved in many ways.

The present invention renders possible, in a manner that is economical and space-saving under all circumstances, the arrangement of such large numbers of the stacking units that the final products can be sorted and stacked in accordance with their sizes of configuration even if the cycle times of the subdividing device are rather short.

The installation constructed in accordance with the present invention makes it possible to use different structural implementations and permits flexibility in the planning and embodiment to an extent that was impossible to achieve heretofore.

At least one storage or pallet supply roller conveyor can be aligned with and arranged upstream of at least one rearward roller conveyor and can serve for temporary storage of the stacks and/or the supply of pallets to the transversely movable stacking units. This particular roller conveyor is then arranged upstream of the downstream roller conveyor in a direction opposite to that in which the downstream roller conveyor transports the stacks of final products that are transferred thereto to a loading station or to a further conveying station and is operative for transporting the pallets to the stacking units when they assume their extended positions. Thus the lifting tables of such stacking units can directly receive the pallets, on which the final products are then stacked after the respective stacking units have been returned to their basic positions. The supply roller conveyor for the pallets is advantageously arranged at a right angle to the storage roller conveyor.

In many cases, it can be advantageously provided that all of the stacking units of a stacking unit row are transversely movable. In this case, the downstream roller conveyor is all that is needed for the transportation of the stacks formed on such stacking units away from such units.

It is particularly advantageous to construct the roller conveyor of the lifting table and the downstream roller conveyor and/or as the case may be, also the discharging roller conveyor, the supply conveyor, or the pallet supply or storage roller conveyor, as driven conveyors. When this expedient is being used, the degree of automation of the installation can be increased. Also, this type of advance of the final products is very advantageous here. The subdividing device may be of any known construction. It includes sawing devices for the provision of the subdividing cuts which subdivide the plate-shaped blank into rectangular final products. The plate-shaped blanks may be relatively large, for instance, they may be several meters long.

The stacking means of the conveying and stacking arrangement of the present invention advantageously includes at least one stacking unit row all of the stacking units of which are individually transversely movable between the basic and extended positions thereof. However, it is also advantageous when the stacking means includes at least one stacking unit row all of the stacking units of which except for the last one are individually transversely movable between the basic and extended positions thereof. According to another feature of the invention, no downstream roller conveyor portion is situated downstream of a front one of the stacking units of at least one stacking unit row.

The conveying and stacking arrangement advantageously further includes at least one stationary roller conveyor arranged downstream of the last one of the stacking unit of at least one stacking unit row and serving for transporting the stacks formed in the last stacking unit away from such unit in the basic position of the latter. It is also advantageous for the downstream roller conveyor to include at least one stationary roller conveyor portion. The stacking units of at least one stacking unit row include respective lifting tables which are advantageously arranged so close to one another that the stacks can be transferred directly from one of the lifting tables to another. The aforementioned transporting means advantageously includes at least one supply roller conveyor which transports the final products to at least one stacking unit row. This supply roller conveyor may then be operative for transporting the final products to two stacking unit rows which are arranged oppositely to one another.

In accordance with a further advantageous concept of the present invention, there is provided at least one air-cushion table serving for the transfer of the final products from the supply roller conveyor to the respective stacking units. It is especially advantageous when at least one stacking unit row of the stacking means includes at least three of the stacking units.

DESCRIPTION OF THE DRAWING

The above and other objects, features, and advantages will become more readily apparent from the following, reference being made to the accompanying drawing in which.

SPECIFIC DESCRIPTION

Figure 1A:
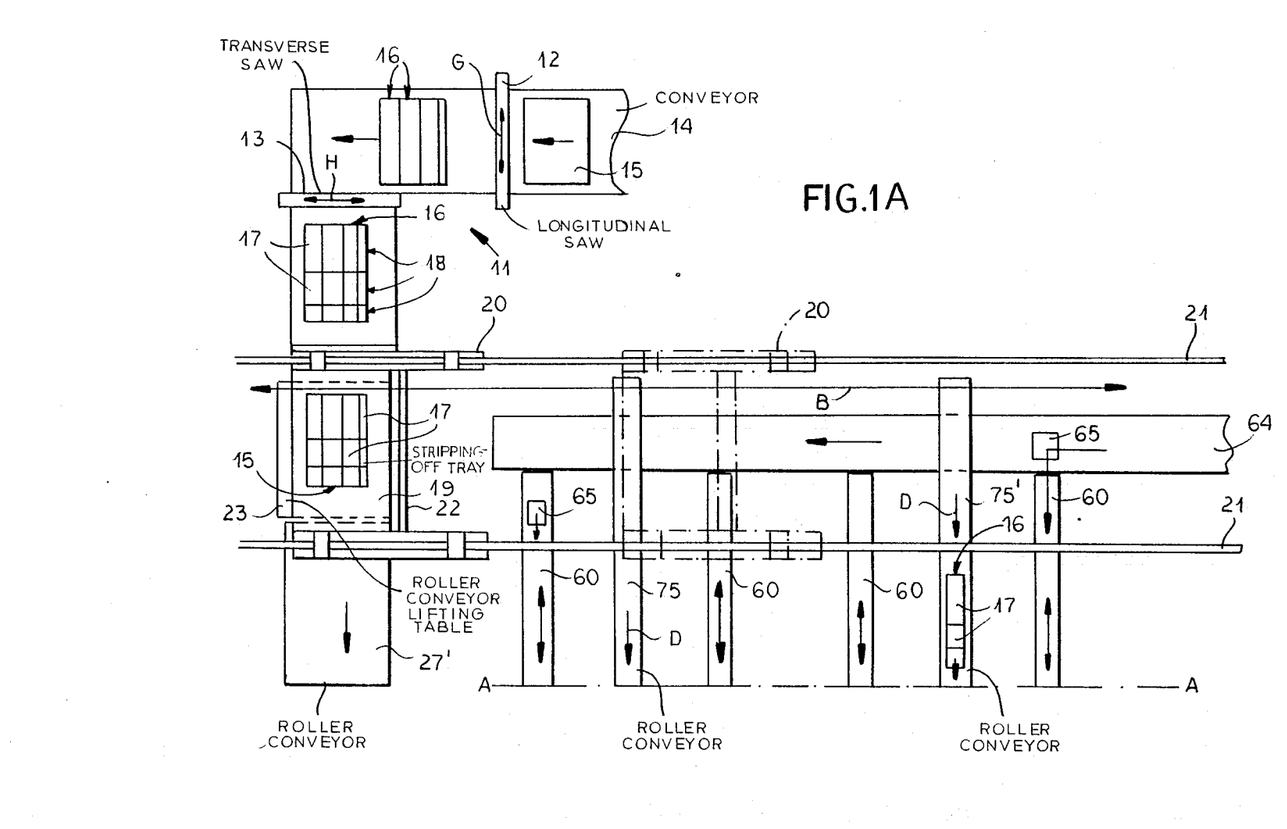
FIG. 1A and 1B, which complement each other and represent structure meeting at a parting line A—A, depict in diagrammatic form the apparatus according to this invention.
Figure 1B:
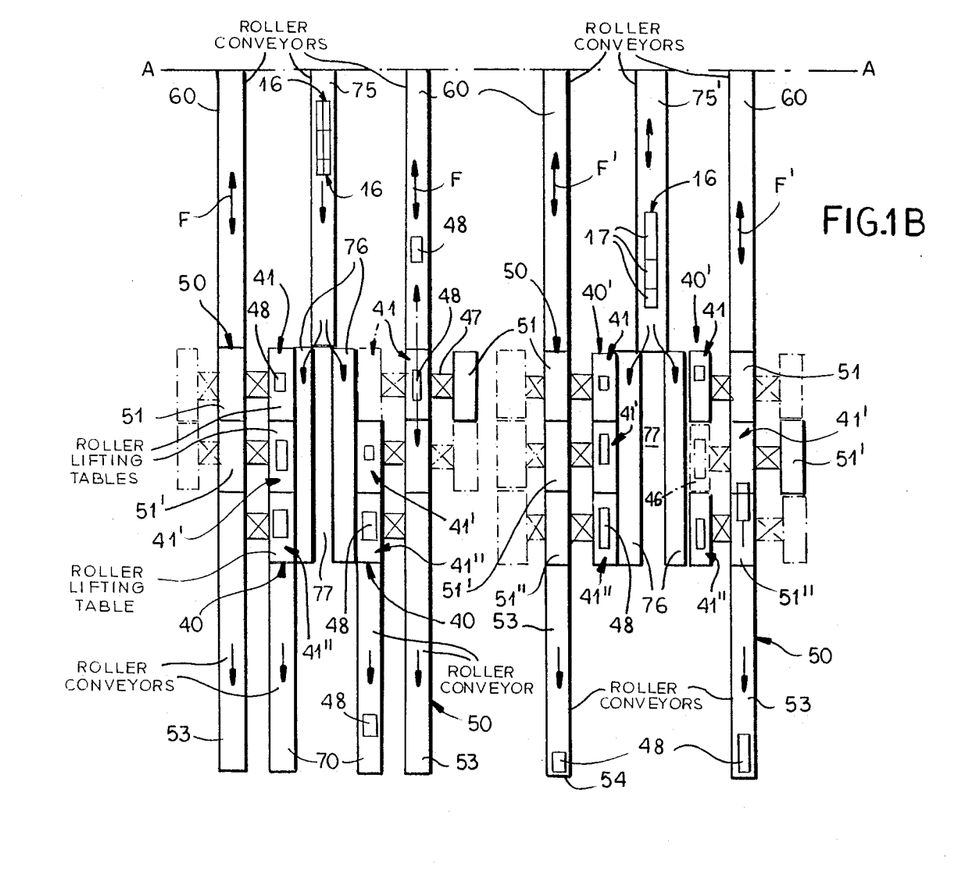

As seen in FIGS. 1A and 1B a sawing arrangement 11 of the type described in my copending patent application Ser. No. 07/306,839 filed 03 Feb. 1989, now U.S. Pat. No. 4,911,281, has a longitudinal sawing device 11 and a transverse sawing device 12. The devices 11 and 12 cut a plate blank 15, which may be constituted by a single plate or by a plate packet consisting of a plurality of individual plates of the same size which are superimposed in a stack and which is supplied to the longitudinal sawing device by a conveyor 14, by means of cuts extending in a direction indicated by an arrow G into longitudinal rows 16. Thereafter, the thus partially subdivided plate blank 15 is advanced to the transverse sawing device 13 where it is sawed or subdivided by means of cuts extending in a direction indicated by an arrow H into transverse rows 18 so that the longitudinal rows 16 are subdivided into final products 17 of different widths. Where the plate blank 15 from which the final products 17 were obtained in this manner was constituted by a single plate, each of the final products 17 is an individual final object. On the other hand, where the plate blank 15 included a plurality of superimposed plates, that is a plate packet, then each of the final products 17 consists of a corresponding plurality of individual final objects of corresponding sizes which are superimposed with one another, i.e. form a stack, and whose edges are aligned with each other.

The illustrated subdivided plate blank 15 includes four longitudinal rows 16 of strips having different widths and three transverse rows 18 of strips also having different widths, resulting in a total of twelve final products 17 of different sizes. Each of the final products 17 can thus consist of a single individual final object or of a plurality of superimposed individual objects, the associated edges of which are aligned with one another. Naturally, any other arbitrarily chosen subdivision patterns are possible.

This subdivided plate blank 15 is then automatically shifted or stripped off away from the transverse sawing device 13 onto a horizontal stripping-off tray 19 which may be constituted by a table plate, by a plurality of carriers which form a horizontal or tiltable support plane and which may form between themselves a plurality of parallel slots that advantageously extend in the stripping-off direction, by a grid, or the like.

This stripping-off tray 19 is mounted on a suspension carriage 20 or on another carriage that is supported on stationary straight rails 21 which are mounted at a high elevation above ground, that is at an upper level, for to and fro movement in the directions indicated by a double-headed arrow B (FIG. 1A).

Associated with the stripping-off tray 19 is a stripping arrangement which is also arranged on the carriage 20 or on a different carriage. As described in my above-cited copending patent application Ser. No. 07/306,839 filed 03 Feb. 1989, now U.S. Pat. No. 4,911,281, the stripping arrangement includes a stripping blade 22 or the like whose position is adjustable with respect to the carriage 20 and to the stripping-off tray 19 parallel to the direction of movement B of the carriage 20 and that serves for shifting the longitudinal rows 16 in the direction G transverse to their longitudinal extents from the stripping-off tray 19 which at the same time itself moves in the direction B onto mutually parallel stationarily mounted input roller conveyors 23, 75, and 75'. The two input conveyors 75 and 75' constitute supply roller conveyors to respective pairs of stacking substations 40 and 40'. The roller conveyor 23 is arranged on a stationary lifting table 25 below the basic position of the stripping-off tray 19. The roller conveyor 23 does not lead to any stacking unit. Instead, the roller conveyor 23 serves the purpose of forming thereon stacks of complete subdivided plate blanks 15 which can then be conveyed further by means of a driven roller conveyor 27' to an unillustrated withdrawing station. The lifting table 25 and the roller conveyor 27' are not essential components of the installation according to the present invention.

For the stripping of the respective longitudinal row 16 from the stripping-off tray 19, which assumes a somewhat inclined position during this operation, onto one of the supply input conveyors 75 or 75', the stripping blade 22 is disposed above the respective supply input conveyor 75 or 75' and the stripping-off tray 19 is moved in the direction B perpendicular to the longitudinal direction of the respective input conveyor 75 or 75'. The stripping-off tray 19 is withdrawn from underneath the respective longitudinal row 16 which is prevented from moving with the stripping-off tray 19 by the stripping blade 22. During this operation, the respective longitudinal row 16 is in each instance shifted in its entirety by the stripping blade 22 perpendicular to its longitudinal direction from the stripping-off tray 19 down onto the respective straight input conveyor 75 or 75' by the movement of the stripping-off tray 19 in the direction of the arrow B. Thereafter, the thus transferred longitudinal row 16 lies on the respective input conveyor 75 or 75', as shown, parallel to its longitudinal direction which also corresponds to the direction in which the driven input conveyors 75 and 75' are able to transport the longitudinal rows 16 that are transferred thereto in their longitudinal direction in accordance with arrow D.

The subdivision of the respective plate blank 15 in the subdividing arrangement 11, as well as the entire transfer or distribution of the final products 17 of the respective subdivided plate blank 15 to the input conveyors 75 and 75' can be accomplished in a fully or partially automated manner and under the control of an appropriate program.

The input conveyors 75 and 75' can be relatively narrow, preferably narrower than the maximum width of the plate blanks 15 that can be processed or handled by the saw.

The carriage 20 can be moved to the input conveyors 75 and 75' in an arbitrarily programmable manner and can selectively distribute the longitudinal rows 16 of each subdivided plate blank 15 to arbitrarily selectable ones of these input conveyors 75 and 75'.

In the event that it should be desired, rather than transferring complete longitudinal rows 16 onto the input conveyors 75 and 75', to transfer onto such input conveyors 75 and 75' in each instance just one final product 17 or a number of the final products 17 of the respective longitudinal row 16 that is less than the total number of the final products 17 in such a row 16, the stripping-off tray 19 can first transfer the longitudinal rows 16 or respective ones of the longitudinal rows 16 to a distribution carriage which is then capable of distributing the final products 17 individually or in groups to the input conveyors 75 and 75'.

Figure 2:
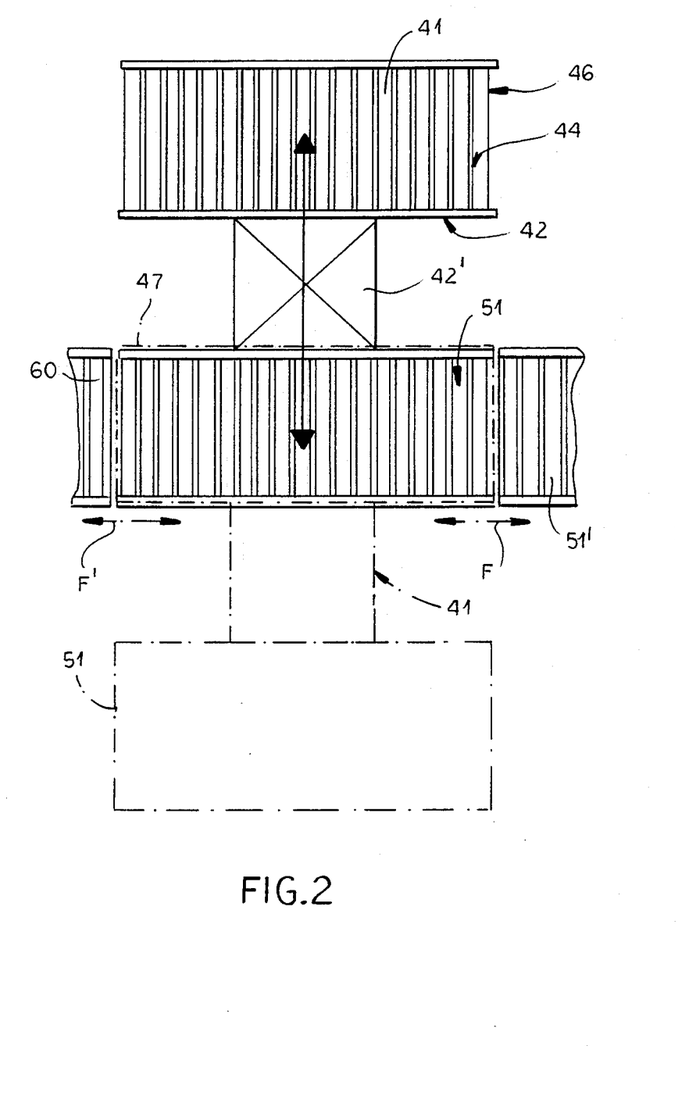
FIG. 2 is a top view in larger scale than FIG. 1 of a transversely movable stacking unit according to the invention.
Figure 3:
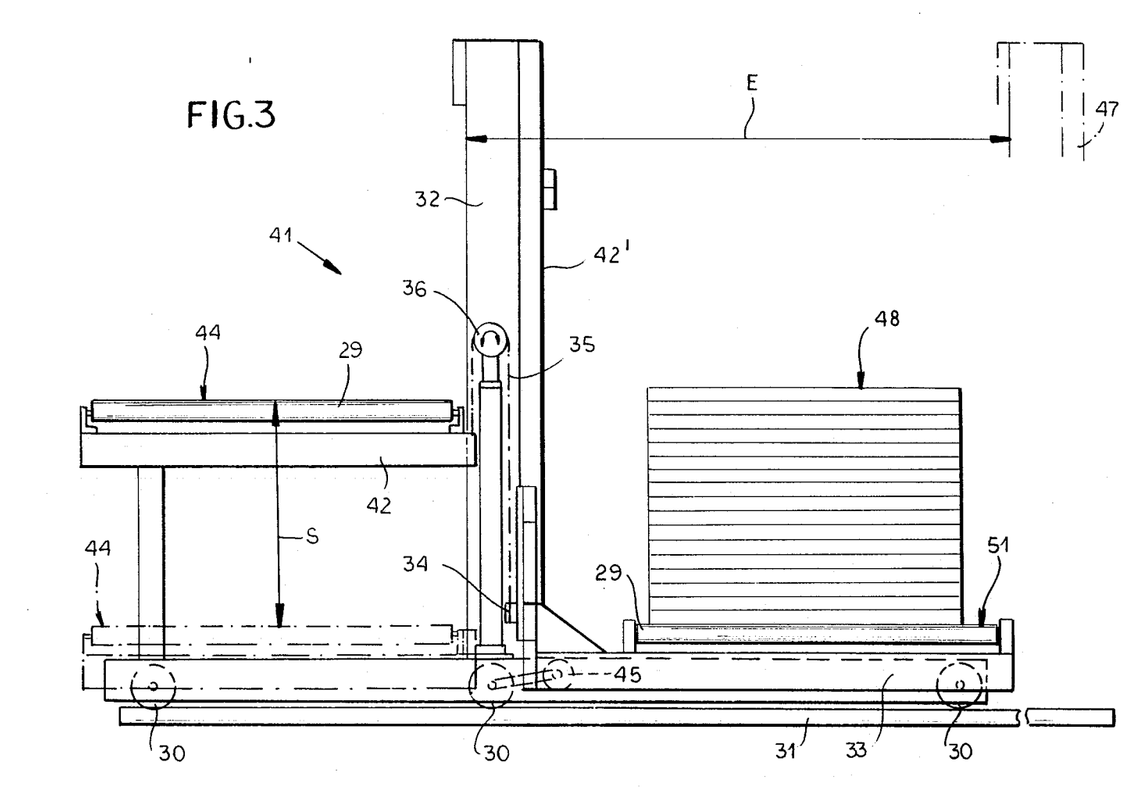
FIG. 3 is an end elevational view of a stacking unit of this invention.
Figure 4:
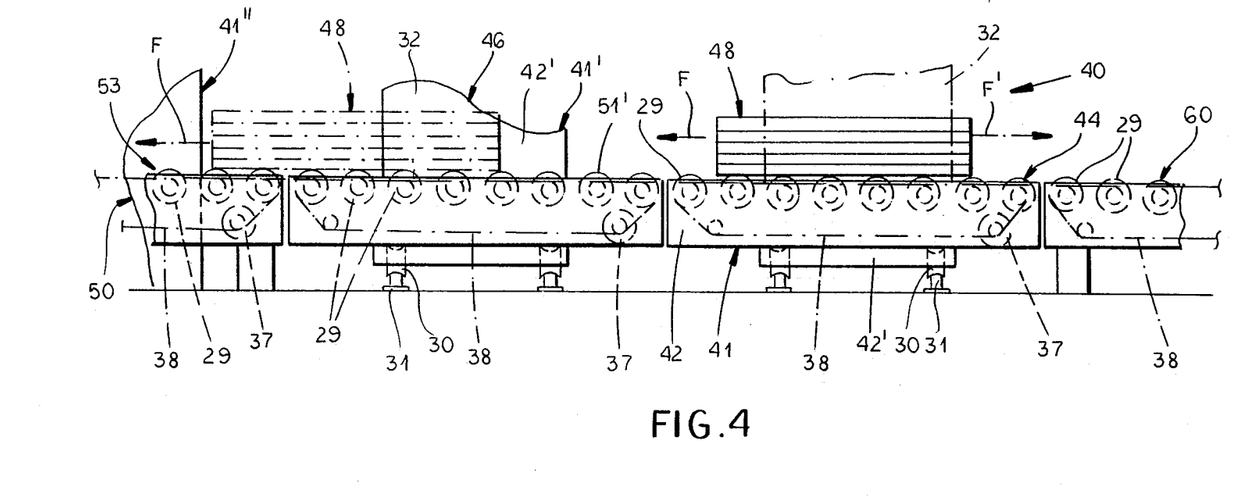
FIG. 4 is a side elevational view showing how the stacking units align with the upstream and downstream roller conveyors.

Each of the two input conveyors 75 and 75' feeds directly to the respective pair of parallel stacking substations 40 and 40'. In the arrangement which is illustrated in the drawing, each such stacking substation 40 or 40' includes three stacking units 41, 41', and 41" which in turn include respective lifting tables 42 that are equipped with respective driven roller conveyors 44 (see FIGS. 2, 3, and 4) which transport away respective stacks 48, that have been formed on them. The lifting tables 42 of the individual stacking units 41, 41' and 41" of the respective substations 40 and 41', which are adjustable by motor drive means 34, 35, 36 (FIG. 3) on respective frames 42' of the stacking units 41, 41' and 41" as to their vertical positions, are arranged immediately next to one another in such a manner that they are capable of forming, when they are arranged at the same elevation, a continuous roller conveyor so that the final products 17 or the stacks 48 can be conveyed, if desired, on this combination roller conveyor.

The upstream stacking unit 41 and the central stacking unit 41' of each of the substations 40 and each of the stacking units 41, 41' and 41" of each of the substations 40' are movable horizontally and perpendicular to the conveying direction of the roller conveyors 44 from a basic position indicated at 46 in which the final products 17 to be stacked are supplied to and stacked on the respective lifting table 42 to an extended position indicated at 47, for the purpose of transporting away the stacks 48 that have been formed on the respective lifting tables 42 by means of downstream roller conveyors 50.

The respective individual straight downstream roller conveyors 50 transport the final product stacks 48 that have been formed on the transversely movable stacking units 41, 41' and 41" of the respective associated stacking substation 40 or 40' in each instance to a respective removal station or a further transportation station. Each of the downstream roller conveyors 50 includes a stationary roller output conveyor 53 and, laterally adjacent the transversely movable stacking units 41 and 41' of the respective associated substations 40, or of the transversely movable stacking units 41, 41' and 41'' of the respective associated substations 40', in each instance a separate, driven, straight roller conveyor 51 or 51' for the substations 40, or 51, 51' or 51'' for the substations 40'. The movable roller conveyors 51, 51' and/or 51'' are capable of being individually driven and are rigidly mounted on the frames 42' of the associated stacking units 41, 41' and/or 41'' at the lateral sides of such units 41, 41' and/or 41'', so as to be movable with such associated stacking units 41, 41' and/or 41''. This is indicated in FIG. 1B and shown in greater detail for a single one of the stacking units 41, 41' and 41'' in FIG. 2 of the drawing. Each individually transversely movable stacking unit 41, 41' and/or 41'' can be, for instance, supported for movement along straight rails 31 (FIG. 3) by means of respective wheels 30 that can be driven in rotation by respective motors 45.

In the basic positions 46 of the stacking units 41, 41' and/or 41'', the roller conveyor portions 51 and 51' or 51, 51' and 51'' that are associated in each instance with one of the stacking substations 40 or 40' are in alignment with the respective associated separate driven output conveyors 53. The roller conveyors 53 transport the stacks 48 supplied thereto to respective removal stations, further transportation stations or the like. These roller output conveyors 53 are not transversely movable. Thus, each of the roller conveyors 51, 51', and 51'' and 53 constitutes an individually driven separate roller conveyor which can be switched on or off for the transport of the stacks 48 independently from the other roller conveyor portions of the respective roller conveyor 50. The roller conveyors 53 may be advantageously constructed also as friction-driven roller conveyors which are constantly switched on and which transport the stacks 48 immediately after such stacks 48 have been loaded thereon.

Upstream of each of the downstream roller conveyors 50, there is further arranged in an aligned relationship therewith a separate stationary pallet and/or storage roller conveyor 60 which can preferably also be driven by a reversible drive in order to be able to transport products 17 or stacks 48 thereof in the direction of the illustrated arrows F and F'.

All of the roller conveyor portions of each of the individual downstream roller conveyors 50 can cooperate in the transportation of the stacks 48 which are supplied to the respective downstream roller conveyors 50 from the roller conveyors 60 which are arranged upstream of such downstream roller conveyors 50 and on which these stacks have been previously stored. The downstream roller conveyor 50 transports the stacks 48 directly from the lifting tables of the associated transversely movable stacking units 41, 41' and/or 41'' to the end of the roller output conveyor 53.

In the stacking substations 40 only the upstream stacking unit 41 and the central stacking unit 41' are transversely movable. On the other hand, the last stacking unit 41'' of each of the substations 40 is not transversely movable. In contradistinction thereto, in the stacking substations 40', all of the stacking units 41, 41' and 41'' are transversely movable. For this reason, each of the downstream roller conveyors 50 which is associated with these two substations 40' is provided laterally adjacent each respective stacking unit 41, 41' and 41'' with a separate roller conveyor portion 51, 51' and 51''. Each such roller conveyor portions 51, 51' and 51'' is moved with the associated stacking unit 41, 41' and 41'', when the latter is moved out of its respective basic position 46 into its extended position 47, out of the path of the respective downstream roller conveyor 50 in question. Then, the roller conveyor 44 of the lifting table 42 of the respective stacking unit 41, 41' or 41'' is moved into the respective roller conveyor 50 as a replacement for the respective roller conveyor portion 51, 51' or 51'' in such a manner that the aforementioned roller conveyor 44 is then in alignment with the remainder of the roller conveyor 50 and immediately adjoins the latter on one side or on both sides without any, or with only a small, spacing therefrom. This is preferably the case in the lowest position of the lifting table 42 for its roller conveyor 44, in order to be able to utilize the maximum, stacking height of the stacking unit. The downstream roller conveyors 50 are arranged at correspondingly low elevations. The lifting tables 42 of the stacking units 41 can also directly adjoin respective roller conveyors 60. The length and the width of the roller conveyors 44 of the lifting tables 42 respectively correspond to the length and width of the roller conveyor portions 51, 51' and 52'' which are arranged next to these stacking units, and the transversely movable stacking units 41, 41' and 41'' of the substations 40' are individually movable out of their basic positions that serve for the stacking of the final products 17 into their extended positions that serve for the transportation away of the stacks 48 that are situated thereon, so that then the respective stack 48 can be transferred from each of these roller conveyors 44, when it is situated at the same elevation as the associated downstream roller conveyor 50 and thus also the roller conveyor 60, directly to the adjoining roller conveyor portion 51' or 51'' of the downstream roller conveyor 50 and, if so desired for the interim storage, also to the roller conveyor 60 either directly or via the roller conveyor 51 or the roller conveyors 51 and 51'. The stack 48 can thus be transported either to an end 54 of the roller conveyor 50 that is arranged at an arbitrarily remote location from the respective stacking substation, or to the roller conveyor 60. In the latter case, the roller conveyor 60 serves for a temporary storage of the particular stack 48 until a later time at which it is transported by the roller conveyor 60 to an end 54. At the end 54 of the respective roller conveyor 50, the respective stack 48 can be removed, for instance, transferred to a transporting carriage, or supplied to a further treating station, or the like.

In the stacking substations 40, the respective stacking units 41'' are not transversely movable, so that the final product stacks 48 which are formed on their lifting tables 42 cannot be transported away by the respective downstream roller conveyors 50. Therefore, a discharging roller conveyor 70 is directly associated with each of the lifting tables 42 of these stacking units 41'', being parallel with the downstream roller conveyors 50 and situated at the elevation of the lowest lifting position of the lifting table 42. The discharging roller conveyors 70 also terminate at the elevation of the free ends 54 of the downstream roller conveyors 50, and the stacks 48 which are formed on the stacking units 41'' of the stacking substations 40 can be transferred to such discharging roller conveyors 70 and then transported away by such driven discharging roller conveyors 70 in the lowermost positions of the respective lifting tables 42.

As illustrated, the supply of the final products 17 on the supply input conveyors 75 and 75' to the respective stacking units occurs in the same sense as the transporting direction of the stacks 48 formed from such final products 17 away from the respective stacking units via the downstream roller conveyors 50 or possibly also via the roller conveyors 70. This codirectional flow of the final products 17 and stacks 48 is extremely important for the installations of the type here under consideration for the further transportation of the stacks 48 away, or for their other further conveyance. This, as well, is made possible by the present invention for arbitrarily large numbers of stacking units per stacking substation.

Even though it is not absolutely necessary in conjunction with the stacking substation 40', because of the transverse movability of the downstream stacking stations 41'', to associate the discharging roller conveyors 70 similar to those used with the stacking units 41'' of the stacking substation 40 therewith, it is nevertheless possible, if desired, to associate such discharging roller conveyors 70 with the stacking units 41'' of the stacking substations 40, inasmuch as this may be instrumental in increasing the throughput of the final products 17 and the discharge or transportation away of the stacks 48 formed therefrom even further and, as a result of this expedient, there is provided an even increased number of unloading stations or the like for the stacks 48.

The longitudinal directions of the downstream roller conveyors 50 extend, as illustrated, parallel to the stacking substations 40 and 40' and, therefore, also parallel to the longitudinal directions of the supplying input conveyors 75 and 75'.

The storing and/or pallet roller conveyors 60 can serve, as mentioned before, for the storage of the stacks 48. However, in the exemplary embodiment of the present invention disclosed here, they can also serve for supplying pallets 65 to the respective stacking units of the respective stacking substations 40 and 40'. To this end, a supply roller conveyor 64 for the pallets 65 extends transverse to the roller conveyors 60 and is supported directly on the floor of the room so as to be at the elevation of the support plane of the aforementioned roller conveyors 60 and so as not to be able to interfere with the movement of the stripping-off tray 19 which moves at a considerably higher elevation. The roller conveyor 64 may also be constructed as a driven conveyor, and the pallets 65 which are moved thereby to positions situated upstream of the respective roller conveyors 60 can be transferred by means of pushers or the like to the roller conveyors 60 and from there to the lifting tables 42 of the transversely movable stacking units while the respective lifting tables 42 are moved to their positions in which they are situated in the downstream roller conveyors 50 and in alignment with the roller conveyors 60. Thereafter, the respective stacking unit can be moved back into its basic position and may then be operated to stack the final products 17 directly onto the respective pallet 65.

In the two substations 40, where the downstream stacking units 41'' are not transversely movable, the supply of the pallets 65 to the lifting tables 42 of such stacking units 41'' may be accomplished by means of the central stacking units 41', as will be readily realized without any need for further explanation. However, it is also possible to choose a transportation path for the supply of the pallets 65 via the front stacking units 41, or a different way of pallet supply. In contradistinction thereto, in the stacking substations 40', the pallets 65 can be supplied directly even to the stacking unit or units 41''.

Along the stacking units 41, 41' and 41'' of each of the stacking substations 40 and 40', there are arranged air-cushion sorting tables 76 at the upper level of the uppermost lifting positions of the roller conveyors 40 of the lifting tables 42. The final products 17 which arrive on the supply input conveyors 75 and 75' can be moved by means of such an air-cushion table 76 to the individual stacking units 41, 41' and 41'' of the stacking substation 40 or of the stacking substation 40'. This can be preferably accomplished manually by an operator who is present in an aisle 77 between the two stacking substations 40 and 40 or 40' and 40'. In this manner, it is possible to achieve a very rapid, unproblematic and simple transfer of the arriving final products 17 of different sizes by the respective operator to the proper different stacking units. Thus, final products 17 of twelve different sizes can thus be simultaneously stacked on the respective lifting tables 42 of the stacking units 41, 41' and 41'' of the four stacking substations 40 and 40'. However, it is also possible, if desired, to simultaneously stack on the lifting tables 42 or at least on one of the lifting tables 42, in each instance, a plurality of the final products 17 of different sizes in stacks 48 of the final products 17 having the same size, if the subdividing program for the plate-shaped blanks 15 permits it.

Instead of the illustrated three stacking units 41, 41' and 41'' in each of the stacking substations 40 and 40', each of the stacking substations 40 and 40' could be provided with only two of the stacking units, or with a number of the stacking units which is arbitrarily greater than three.

This installation or machine is extremely versatile and renders possible a rapid throughput of the final products 17, even when all of such final products 17 have different sizes, as well as the stacking of such final products 17 in respective stacks 48, with a relatively small available space requirement for the installation. This installation can also be provided with a high degree of automation. Under certain circumstances, even the aforementioned involvement or work of the two operators present in the two aisles 77 can be dispensed with by automating their activity, in that the distribution of the final products 17 from the supply input conveyors 75 and 75' to the individual stacking units 41, 41' and 41'' is automated as well.

It is also possible in some cases that no storing or pallet roller conveyor 60 is associated with at least one of the downstream roller conveyors 50. Under such circumstances, there is no need for the provision of the downstream roller conveyor portion 51 at the upstream stacking unit 41 of the respective stacking substation, inasmuch as such downstream conveyor portion 51 would then serve no purpose. When the respective stacking substation then consists of only two of the stacking units, the respective downstream roller conveyor 50 can then be constituted only by the stationary roller conveyor 53.

An operating cycle of the installation disclosed here may advantageously be conducted, for instance, in the following manner:

The operation of the subdividing arrangement can be performed in a program-controlled manner, and may occur as described in my above-cited U.S. Pat. No. 4,911,281 with respect to the distribution of the longitudinal rows 16 of the subdivided plate-shaped blanks 15 by means of the stripping-off tray 19 and its stripping-of device 22 to the supply input conveyors 75 and 75'. The workers or operators who are present in the aisles 77 provided between the respective stacking substations 40 and 40' transfer the final products 17 which arrive on the supply input conveyors 75 and 75' to their working stations manually, by means of the air-cushion tables 76, to the lifting tables 42 of the respective stacking units, on which these final products are stacked in a manner sorted in accordance with their sized. Each of the lifting tables 42 is lowered in a light-barrier controlled manner after each deposition of the respective final product 17 thereon, or on the stack 48 being formed thereon, to such an extent that the upper plane of the respective stack 48 is again situated at the elevation of the respective air-cushion table 76, so that the respective operator is then again able, after the arrival of the next one of the final products 17 that are to be stacked to form the respective stack 48, to manually transfer this next final product 17 by means of the air-cushion table on top of the thus forming stack 48, whereupon the lifting table 42 is lowered again in the light-barrier controlled manner. When a plurality of the stacks 48 is being formed simultaneously on the respective lifting table 42, the lowering of the lifting table 42 may be accomplished only after the deposit of one of the final products 17 on each and every of such stacks 48. When the respective stack 48 has achieved its desired height, or when the lifting table 42 of one of the stacking units has arrived at its lowermost position, there may be performed, either automatically or in response to an initiating action by the operator, the transportation of the respective stack 48 or of all of the stacks 48 present on this lifting table 48 away from this lifting table. This is achieved, where the respective stacking unit is transversely movable, by moving the respective stacking unit by its motor drive 34, 35, 36 out of its basic position 46 into its extended or displaced position 47 and then, as a result of the operation of the respective roller conveyor 44 by means 37, 38, by transporting the respective stack or stacks 48 in the direction of the arrow F (see FIG. 2) for transfer to the end of the respective roller conveyor 53, or in the direction of the arrow F' for interim storage on the respective roller conveyor 60.

In the stacking substations 40, the stacks 48 which are formed in the stacking units 41" are transported away via the roller conveyors 70.

When the stacking in this installation is to take place on the pallets 65, the pallets 65 may be transferred to the lifting tables 42 of the transversely movable stacking units immediately after each completion of the transportation of the respective preceding stacks 48 from the respective lifting tables 42, and the respective transversely movable stacking units may be moved back to their respective basic positions 46 only afterward.

There are also other possibilities for the operating cycle of the installation, for instance, an even higher, or a lower, degree of its automation.

When one of the stacking substations includes only two of the stacking units, and the last one of these stacking units is not transversely movable, then the entire downstream roller conveyor 50 may be arranged in a stationary manner, especially when no pallet and storage roller conveyor 60 is associated with this station. In this case, the region of this downstream roller conveyor 50 which is arranged laterally of the respective stacking substation is provided only downstream of the last stacking unit of this substation, so that the lifting table 42 of the front stacking unit can be moved to the front end of the downstream roller conveyor 50. This region of the downstream roller conveyor 50 can, in some cases, form the downstream roller conveyor 50 exclusively, even though it is, in general, more advantageous to make this downstream roller conveyor 50 longer, especially considerably longer, and thus to let it project parallel to the longitudinal direction of the respective stacking substation, preferably to a considerable extent.

While the present invention has been described and illustrated herein as embodied in a specific construction of a stacking installation for a plate-subdividing machine, it is not limited to the details of this particular construction, since various modifications and structural changes are possible and contemplated by the present invention. Thus, the scope of the present invention will be determined exclusively by the appended claims.

What is claimed is:

1. An arrangement for conveying and stacking final products created by subdivision of a succession of plate blanks into a plurality of such products, the arrangement comprising:
   a sorting table at an upper level;
   means including an input conveyor for supplying the products in a longitudinal transport direction at the upper level to the sorting table;
   means including an output conveyor offset laterally from the input conveyor for transporting stacks of the products away from the sorting table in the transport direction and having an upstream end laterally adjacent the sorting table at a lower level below the upper level of the input conveyor, whereby the products can be moved on the sorting table at the upper level to either of two stacking substations longitudinally aligned with the upstream end of the output conveyor; and
   respective stacking units at the substations each in turn having
      a stacking table displaceable vertically between the upper and lower levels and horizontally displaceable transversely of the transport direction between a basic position at the respective substation for receiving the final products therefrom and an extended position aligned longitudinally with the output conveyor for delivering the final products thereto; and
      a conveyor section fixed to and displaceable jointly transversely with the stacking table such that in the basic position of the respective stacking table the conveyor section forms a longitudinal continuation of the output conveyor.

2. The arrangement defined in claim 1 wherein the stacking units are longitudinally aligned with each other, one of the stacking units lying longitudinally between the other stacking unit and the upstream end of the output conveyor such that the respective conveyor section can convey a stack from the conveyor section of the other unit to the output conveyor.

3. The arrangement defined in claim 2 wherein the stacking table has an upper surface constituted as an independently driven longitudinal conveyor.

4. The arrangement defined in claim 2 wherein the conveyor sections of the units are not vertically displaceable.

5. The arrangement defined in claim 2 wherein there are two such laterally spaced output conveyors and two rows of such stacking units flanking the sorting table and associated with the respective output conveyors, each such row including at least two such stacking units.

6. The arrangement defined in claim 5 wherein at least one of the rows includes at its downstream end a stacking unit substantially identical to the stacking units of the other rows but not transversely displaceable, the arrangement being provided with a secondary output conveyor like the first-mentioned output conveyor but aligned with the stacking table of the transversely nondisplaceable stacking unit.

7. The arrangement defined in claim 2, further comprising an upstream conveyor aligned longitudinally with the output conveyor but extending longitudinally upstream at the lower level from the stacking unit.

8. The arrangement defined in claim 7, further comprising means for supplying pallets to the upstream conveyor for formation of the stacks thereon.

9. The arrangement defined in claim 2 wherein the conveyor sections are independently driven roller conveyors.

10. The arrangement defined in claim 2 wherein the sorting table is an air-cushion table having an upper surface at the upper level.

* * * * *